No. 897,282. PATENTED SEPT. 1, 1908.
A. FRESCHL.
SEAT.
APPLICATION FILED AUG. 1, 1907.
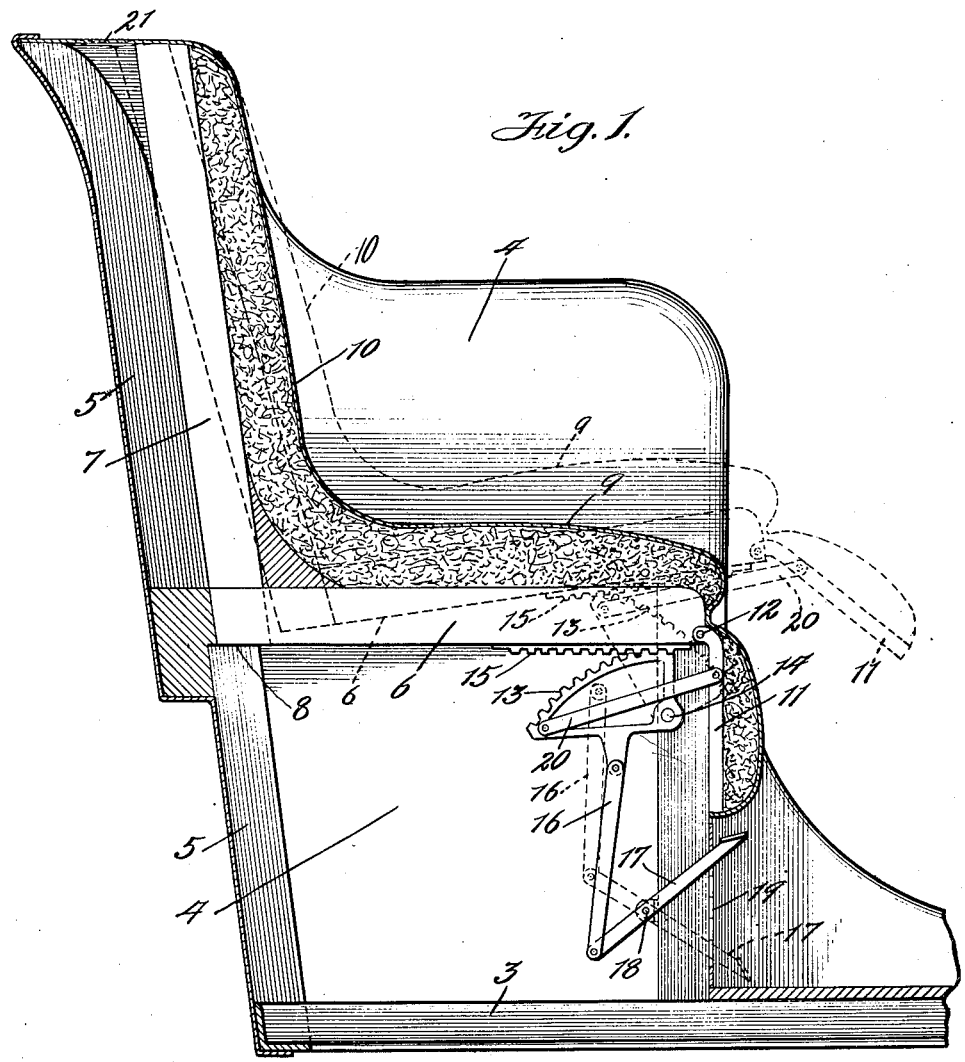
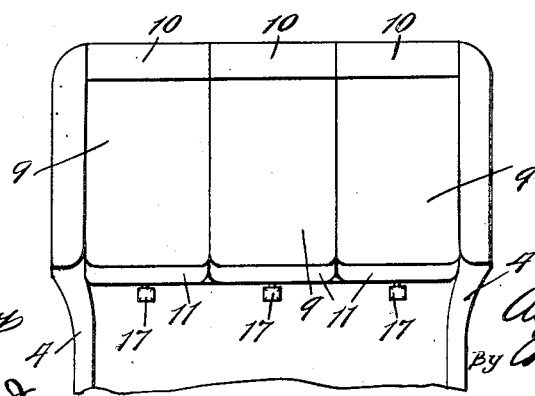

UNITED STATES PATENT OFFICE.

ALFRED FRESCHL, OF CHICAGO, ILLINOIS.

SEAT.

No. 897,282.  Specification of Letters Patent.  Patented Sept. 1, 1908.

Application filed August 1, 1907. Serial No. 386,526.

*To all whom it may concern:*

Be it known that I, ALFRED FRESCHL, a citizen of the United States, residing at Chicago, in the county of Cook and State of Illinois, have invented certain new and useful Improvements in Seats, of which the following is a specification, reference being had therein to the accompanying drawing.

My invention relates to seats, and more particularly to automobile seats, and the invention consists in the arrangements and organizations of parts to be hereinafter described and then pointed out in the appended claims.

The usual type of automobile is provided with a heavily upholstered rear seat and back, which are rigidly secured to the frame of the automobile body, the inclination of the back with reference to the seat being very slight. While such a seat and back are comfortable for short rides they prove uncomfortable during long ones, as there is no way by which the back may be tilted to change the position of a person's body. To relieve the fatigue due to maintaining a more or less upright position it is often customary to sit well forward on the seat and rest the head and shoulders against the back, a position in itself unnatural and fatiguing as well.

The object of my invention is to provide a seat and back for automobiles adapted to be tilted or inclined, though it is of course to be understood that I do not mean to limit my invention to automobiles as it is obvious that it may be employed in connection with chairs, car-seats etc. without departing from the spirit thereof.

In the accompanying drawing in which the same reference numerals indicate like parts shown in the several figures; Figure 1 is a cross sectional view of the rear portion of the body of an automobile provided with my invention; and Fig. 2. is a diagrammatic front view showing the seat and back divided into three tilting sections.

In the present embodiment of my invention I have shown it in connection with the rear portion of the body of an automobile of the ordinary type, and in the drawing the reference numeral 3 indicates the floor of the body, 4 one side thereof, and 5 the back. The seat-frame may be of any suitable construction and material but in the form shown consists of a horizontal seat portion 6 and an integral vertical back portion 7. The lower part of the automobile back 5 provides a shoulder 8, upon which the rear of the seat portion 6 of the seat-frame rests, and the back-portion 7 of the seat normally rests against the automobile back 5, which is usually curved rearwardly near its top. The cushion or upholstered portions 9 and 10 of seat and back are integral, though it is obvious that they may be made separate. A depending rest 11 is pivotally connected to the front of the seat frame as at 12; it is of course to be understood that the parts are suitably upholstered.

The normal position of the seat is shown in full lines in the drawings, and it may be tilted to allow the user to take a more or less reclining position, such as that shown in dotted lines. For this purpose I may employ any suitable means, and as an effective device I pivot an eccentric or cam upon the supporting frame or automobile body under the seat at its front, which may be turned upon its pivot to shift the seat to reclining position; the extent of the inclination depending of course upon the pitch of the eccentric or cam. As shown the tilting device 13 bears against the under side of the seat-portion 6 of the frame, and is arranged in any suitable manner; in long seats it will be preferable to provide a cam under each end in which case they will be connected to move in unison as by rigidly mounting them upon a rod 14 suitably journaled in the frame, and in short seats a single cam centrally arranged will suffice, being either loosely or rigidly connected to the rod. The tilting device may merely bear against the under side of the seat-portion 6, but preferably it is in the form of a rack segment whose teeth mesh with a corresponding rack 15 secured to the under side of the seat-portion 6, as this secures more positive action and prevents accidental displacement of the seat. To tilt the seat to inclined position a link 16 is pivoted at one end to the tilting eccentric or cam at one side of its pivot, and at its other end to a lever 17 pivoted on the supporting frame as at 18, the free end of the lever extending forward into position to be operated by the foot or hand of the operator. To hold the seat in its tilted position a serrated plate 19 is secured in vertical position on the supporting frame adjacent the free end of the lever 17 and with which the lever engages at various points to lock the seat in various positions of inclination.

I prefer to provide a foot or leg rest 11 and in order to automatically raise and lower the rest as the seat is tilted or returned to normal position, a link 20 is pivoted at its opposite ends to the rest and to the inner portion of the tilting eccentric, so that as the eccentric is thrown forward on its pivot it raises the rest to position in extension of the seat as shown in dotted lines in Fig. 1, withdrawing the rest to folded position when the seat is returned to normal position.

When it is desired to incline the seat the lever 17 is depressed and the cam is rocked upwardly, the seat frame being thereby tilted and at the same time drawn forward as it turns upon the automobile back as a fulcrum, the latter being curved for this purpose when it extends to the height of the seat-back. At the same time that the cam is thus rocked the link 20 raises the rest 11, and when the cam has completed its movement all the parts occupy the positions shown in the dotted lines. The space between the top of the back-portion 7 and the back 5 of the automobile body is closed by the covering 21 of the seat which may be of leather or other suitable material and is adapted to fold as the seat is inclined.

I am thus able by my invention to tilt the seat so that the back is shifted from its practically upright position to an inclined position, such as shown in the dotted lines of Fig. 1, and as the seat is accordingly moved, the position of the user may be changed from upright to inclined, the rest 11 being extended to form a support for the lower parts of the legs.

While the entire seat may be tilted, it is obvious that my invention contemplates that different portions of the seat may be separately tilted as by dividing it into sections each provided with its associated tilting devices, such as above described. In Fig. 2 I show a seat divided into three sections each comprising a suitable integral back and seat portion 10 and 9 respectively, and each section being independently tilted by its associated mechanism, such as that described and shown, and operated by its lever 17 in the manner disclosed. In such case a single cam may be employed for each section, arranged centrally thereof as indicated by the reference numeral 17 and carried loosely upon the common rod 14. Each section may also have an associated rest 11, operated as above described.

What I claim is:—

1. A supporting frame having a substantially vertical back, a seat-frame consisting of a horizontal seat-portion and a vertical back-portion in fixed relation to each other in all positions, a shifting support at or near the front of the seat-portion, a seat and back carried by the seat-frame, the seat-frame being supported by the supporting frame and shifting support in normal and inclined positions.

2. A supporting frame having a substantially vertical back, a seat-frame consisting of a horizontal seat-portion and a vertical back-portion in fixed relation to each other in all positions, a cam support at or near the front of the seat-portion, the seat-frame resting on the supporting frame and cam support in all positions.

3. In combination with a supporting frame, a seat-frame, a seat and back carried by the frame, a rack on the seat-frame, a pinion mounted on the body and meshing with the rack to tilt the seat, a lever to move the pinion, and means to hold the rack and pinion against accidental movement.

4. A supporting frame, a seat-frame having a seat and back, a rest pivoted to the front of the frame, a cam to tilt the frame, a lever connecting the cam and rest, and a lever for moving the cam.

In testimony whereof I affix my signature in presence of two witnesses.

ALFRED FRESCHL.

Witnesses:
 ELIZABETH MOLITOR,
 J. McROBERTS.